United States Patent [19]
Herold et al.

[11] Patent Number: 5,952,441
[45] Date of Patent: Sep. 14, 1999

[54] PARTIALLY POLYMERIZED MIXTURE OF DIETHYLENE GLYCOL (ALLYL CARBONATE) COMPOUNDS

[75] Inventors: Robert D. Herold, Monroeville; Bo Wu, Delmont; Michael O. Okoroafor, Export; Charles R. Wiedrich, Murrysville, all of Pa.

[73] Assignee: PPG Industries Ohio, Inc., Cleveland, Ohio

[21] Appl. No.: 09/000,661

[22] Filed: Dec. 30, 1997

[51] Int. Cl.⁶ ..................................... C08F 18/24
[52] U.S. Cl. ............................................. 526/314
[58] Field of Search ............................... 526/314

[56] References Cited

U.S. PATENT DOCUMENTS

| | | | |
|---|---|---|---|
| 4,138,538 | 2/1979 | Kaetsu et al. | 526/73 |
| 4,368,310 | 1/1983 | Leatherman | 526/314 |
| 4,398,008 | 8/1983 | Misura | 526/314 |
| 4,521,577 | 6/1985 | Romano et al. | 526/261 |
| 4,590,248 | 5/1986 | Moriya et al. | 526/228 |
| 4,607,087 | 8/1986 | Moriya | 526/314 |
| 4,613,656 | 9/1986 | Tang | 526/193 |
| 4,623,708 | 11/1986 | Ezrielev | 526/314 |
| 4,686,266 | 8/1987 | Tang | 526/193 |
| 4,742,133 | 5/1988 | Tang et al. | 526/235 |
| 4,812,545 | 3/1989 | Renzi et al. | 526/230.5 |
| 4,835,233 | 5/1989 | Renzi et al. | 526/301 |
| 4,959,429 | 9/1990 | Misura et al. | 526/230.5 |
| 4,959,433 | 9/1990 | Oates et al. | 526/314 |
| 4,970,293 | 11/1990 | Renzi et al. | 528/370 |
| 4,990,578 | 2/1991 | Greco et al. | 523/456 |
| 5,017,666 | 5/1991 | Crano | 526/314 |
| 5,128,384 | 7/1992 | Renzi et al. | 522/13 |
| 5,173,552 | 12/1992 | Renzi et al. | 526/230.5 |
| 5,196,492 | 3/1993 | Renzi et al. | 526/210 |
| 5,219,979 | 6/1993 | Greco | 528/220 |
| 5,286,816 | 2/1994 | Rivetti et al. | 526/230.5 |

FOREIGN PATENT DOCUMENTS

| | | |
|---|---|---|
| 0 144 782 A2 | 6/1985 | European Pat. Off. |
| 227 178 | 7/1987 | European Pat. Off. |
| 114 080 | 3/1988 | European Pat. Off. |
| 347 976 | 12/1989 | European Pat. Off. |
| 204 083 | 12/1990 | European Pat. Off. |
| 473 163 | 3/1992 | European Pat. Off. |
| 506 413 | 9/1992 | European Pat. Off. |
| 201 978 | 12/1992 | European Pat. Off. |
| 1541889 | 9/1968 | France |
| 62 448 | 5/1965 | Germany |
| 51-9188 | 1/1976 | Japan |
| 57-26521 | 6/1982 | Japan |
| 57-133106 | 8/1982 | Japan |
| 61-51012 | 3/1986 | Japan |
| 61-64706 | 4/1986 | Japan |
| 61-296009 | 12/1986 | Japan |
| 5-29664 | 2/1993 | Japan |

OTHER PUBLICATIONS

M. Lasch et al, "Physikalische Messungen an einem Kunststoff als optischem Medium", JAPS, vol. II, pp. 369–381 (1967).

*Primary Examiner*—Paul R. Michl
*Attorney, Agent, or Firm*—George D. Morris

[57] ABSTRACT

A polymerizable, liquid, substantially gel-free composition comprising a partially polymerized mixture of ethylenically unsaturated compounds wherein: (a) the mixture of ethylenically unsaturated compounds which was partially polymerized comprised a mixture of diethylene glycol (allyl carbonate) compounds each represented by Formula I:

Formula (I)

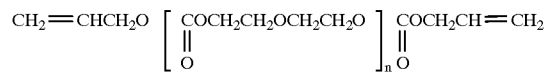

or by Formula II:

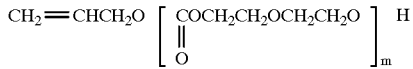

in which n is a positive integer, m is a positive integer, and the diethylene glycol (allyl carbonate) compound for which the value of n is 1 constituted from 25 to 75 area percent of the mixture of diethylene glycol (allyl carbonate) compounds; and (b) the ethylenic double bond utilization of the polymerizable, liquid, substantially gel-free composition is at least 3 percent. The polymerizable, liquid, substantially gel-free composition exhibits low shrinkage in the mold when polymerized.

22 Claims, No Drawings

PARTIALLY POLYMERIZED MIXTURE OF DIETHYLENE GLYCOL (ALLYL CARBONATE) COMPOUNDS

BACKGROUND OF THE INVENTION

Diethylene glycol bis(allyl carbonate) monomer compositions are polymerized using free radical initiators to produce hard polymers. Many of these polymers are substantially transparent to visible light, are substantially colorless, have refractive indices of from about 1.48 to about 1.52, and possess a Barcol hardness above about zero. For these reasons, such monomer compositions find utility as precursors for transparent coatings, optical lenses, optical lens blanks, and other optical elements, and flat or curved transparent sheets. Light transmission characteristics may be altered by incorporating dyes, light absorbing compounds, pigments, and the like, in the monomer composition before polymerization, or by dying the polymer.

Diethylene glycol bis(allyl carbonate) monomer compositions have heretofore been produced by reacting diethylene glycol with phosgene at temperatures between 0° C. and 20° C. to form the corresponding dichloroformate which is then reacted with allyl alcohol in the presence of a suitable acid acceptor, as for example, pyridine, a tertiary amine, or an alkaline or alkaline earth metal hydroxide. See, for example, U.S. Pat. No. 2,403,113. Alternatively, the allyl alcohol can be reacted with phosgene and the resulting chloroformate reacted with diethylene glycol in the presence of an alkaline reagent; see, for example, U.S. Pat. No. 2,370,567. These prior diethylene glycol bis(allyl carbonate) monomer compositions are usually constituted not solely by diethylene glycol bis(allyl carbonate), per se, but also by various related coproduced compounds. The prior diethylene glycol bis (allyl carbonate) monomer compositions therefore usually comprise a mixture of diethylene glycol (allyl carbonate) compounds each represented by Formula (I):

Formula (I)

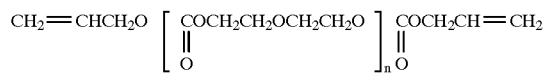

or by Formula (II):

Formula (II)

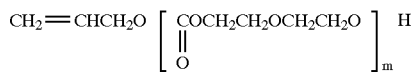

wherein n is a positive integer, m is a positive integer, and wherein the (allyl carbonate) compound for which the value of n is 1 constitutes from 82 to 95 area percent of the mixture of diethylene glycol (allyl carbonate) compounds. As used herein and in the claims, the relative amounts, expressed as area percent, of the diethylene glycol (allyl carbonate) compounds having differing values of n are determined by high performance liquid chromatography using an instrument equipped with a DuPont Zorbax Sil column operated at a temperature of approximately 15° C., a refractive index detector, and employing a mobile phase composition of 40% methylene chloride/25% ethyl ether/25% ethyl ether which was saturated with water/10% n-hexane, where the percentages are expressed as percent by volume.

One problem associated with the polymerization of the prior diethylene glycol bis(allyl carbonate) monomer compositions is the relatively high shrinkage of the material which occurs during the course of polymerization to the final thermoset polymer. For example, there is a shrinkage of approximately 13 percent during the polymerization of diethylene glycol bis(allyl carbonate) monomer. Such high shrinkages are particularly detrimental in casting operations such as those used to produce ophthalmic lenses and ophthalmic lens blanks where the liquid monomer composition is introduced to a mold and thereafter polymerized to the final thermoset polymer.

It is known that shrinkage in the mold may be reduced by introducing a liquid prepolymer to the mold and thereafter polymerizing the prepolymer to the final thermoset polymer. The prepolymer is usually produced by partially polymerizing the diethylene glycol bis(allyl carbonate) monomer composition to consume a portion of the polymerizable ethylenic double bonds. The partial polymerization is stopped, however, before more than a trivial amount of gellation occurs so that the prepolymer may be introduced to the mold as a liquid. Examples of United States patents which disclose prepolymerization of diethylene glycol bis (allyl carbonate) monomer compositions or other polyol bis(allyl carbonate) monomer compositions include U.S. Pat. No. 4,590,248, U.S. Pat. No. 4,623,708, U.S. Pat. No. 4,686,266, U.S. Pat. No. 4,742,133, U.S. Pat. No. 4,959,429, U.S. Pat. No. 4,959,433, and U.S. Pat. No. 5,017,666.

As used herein, shrinkage is determined in accordance with the following equation:

$$S = 100(D_p - D_m)/D_p$$

where:

S is the shrinkage expressed as percent, $D_p$ is the density of the hard polymer (i.e., the final polymerizate), and $D_m$ is the density of the polymerizable composition which is introduced to the mold (i.e., the monomer composition or the partially polymerized monomer composition, as the case may be).

Low shrinkage in the mold is favored by a large utilization of polymerizable ethylenic double bonds during partial polymerization to produce the prepolymer which is introduced into the mold. However, during the partial polymerization of the diethylene glycol bis(allyl carbonate) monomer compositions, the viscosity increases as polymerizable ethylenic double bonds are consumed. For practical purposes the viscosity cannot become so high that the resulting prepolymer does not flow reasonably readily into the mold. Viscosity of the prepolymer therefore provides a practical lower limit to shrinkage in the mold.

DESCRIPTION OF THE INVENTION

It has now been found that a partially polymerized mixture of diethylene glycol (allyl carbonate) compounds at any given viscosity provides lower shrinkage in the mold if the mixture of diethylene glycol (allyl carbonate) compounds had reduced proportions of the diethylene glycol (allyl carbonate) compound for which n is 1. Although the viscosities of the prepolymers still provide practical lower limits to shrinkages in the mold, such practical lower limits characteristic of compositions of the present invention are less than those of prior prepolymerized mixtures of diethylene glycol (allyl carbonate) compounds which had higher proportions of the diethylene glycol (allyl carbonate) compound for which n is 1.

Accordingly the invention is a polymerizable, liquid, substantially gel-free composition comprising a partially polymerized mixture of ethylenically unsaturated compounds wherein: (a) the mixture of ethylenically unsaturated compounds which was partially polymerized comprised a mixture of diethylene glycol (allyl carbonate) compounds each represented by Formula I:

Formula (I)

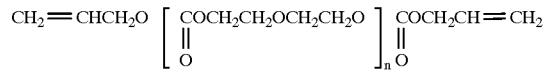

or by Formula II:

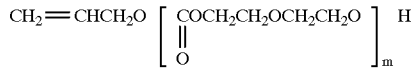

in which n is a positive integer, m is a positive integer, and the diethylene glycol (allyl carbonate) compound for which the value of n is 1 constituted from 25 to 75 area percent of the mixture of diethylene glycol (allyl carbonate) compounds; and (b) the ethylenic double bond utilization of the polymerizable, liquid, substantially gel-free composition is at least 3 percent.

In most but not all instances, compounds represented by Formula (I) where n is 1, 2, 3, 4, 5, 6, and 7 collectively constituted at least 85 area percent of the mixture of diethylene glycol (allyl carbonate) compounds. In many cases compounds represented by Formula (I) where n is 1, 2, 3, 4, 5, 6, and 7 collectively constituted at least 91 area percent of the mixture of diethylene glycol (allyl carbonate) compounds. Preferably compounds represented by Formula (I) where n is 1, 2, 3, 4, 5, 6, and 7 collectively constituted at least 96 area percent of the mixture of diethylene glycol (allyl carbonate) compounds. Generally compounds represented by Formula (I) for which n is greater than 7 collectively constituted from 0 to 5 area percent of the mixture of diethylene glycol (allyl carbonate) compounds. Often compounds represented by Formula (I) for which n is greater than 7 collectively constituted from 0 to 2 area percent of the mixture of diethylene glycol (allyl carbonate) compounds.

The diethylene glycol bis(allyl carbonate) compound represented by Formula (I) for which n is 1 constituted from 25 to 75 area percent of the mixture of diethylene glycol (allyl carbonate) compounds. Often it constituted from 45 to 75 area percent of the mixture of diethylene glycol (allyl carbonate) compounds. From 60 to 70 area percent is preferred.

When present, compounds represented by Formula (II) where m is 1, 2, and 3 usually collectively constituted from 0.01 to 7 area percent of the mixture of diethylene glycol (allyl carbonate) compounds. Frequently compounds represented by Formula (II) where m is 1, 2, and 3 collectively constituted from 0.05 to 4 area percent of the mixture of diethylene glycol (allyl carbonate) compounds. Often compounds represented by Formula (II) where m is 1, 2, and 3 collectively constituted from 0.1 to 3 area percent of the mixture of diethylene glycol (allyl carbonate) compounds. Compounds represented by Formula (II) for which m is greater than 3 usually collectively constituted from 0 to 3 area percent of the mixture of diethylene glycol (allyl carbonate) compounds. Compounds represented by Formula (II) for which the value of m is greater than 3 often collectively constituted from 0 to 1.5 area percent of the mixture of diethylene glycol (allyl carbonate) compounds. From 0 to 1 area percent is preferred.

The ethylenic double bond utilization of the polymerizable, liquid, substantially gel-free composition is at least 3 percent. Frequently the ethylenic double bond utilization is in the range of from 3 to 16 percent. Often the ethylenic double bond utilization is in the range of from 6 to 14 percent. From 8 to 12 percent is preferred. As used herein and in the claims, the ethylenic double bond utilization of the polymerizable, liquid, substantially gel-free composition is the percentage of total available ethylenic double bonds of monomer which are consumed in forming the prepolymer. The ethylenic double bond utilization is determined by iodometric titration as follows. One gram of sample weighed to the nearest 0.0001 gram is added to a 250-milliliter Erlenmeyer flask, and 50 milliliters of chloroform is added to dissolve the sample. Twenty milliliters of a 0.5 molar solution of iodine monochloride in acetic acid is added. The flask is capped and stored in the dark for one hour. Fifty milliliters of a 1.8 molar aqueous solution of potassium iodide is then added and titration with a standard 0.5 normal sodium thiosulfate solution is begun with vigorous stirring. Titration is continued until the yellow color disappears. The titration should be carried out slowly when approaching the endpoint to avoid over-titration. A blank is also titrated in the same manner. Iodine value, whether of the partially polymerized monomer or of the initial monomer which has not been partially polymerized, is calculated as follows:

$$I = (T_b - T_s)(N)(12.692)/W$$

where:

I is the iodine value expressed as grams of $I_2$ per 100 grams of sample;

$T_b$ is the titer of the blank expressed as milliliters of the sodium thiosulfate solution;

$T_s$ is the titer of the sample expressed as milliliters of the sodium thiosulfate solution;

N is the normality of the sodium thiosulfate solution; and

W is the mass of the sample expressed in grams. The ethylenic double bond utilization is calculated as follows:

$$U = 100(I_i - I_p)/I_i$$

where:

U is the ethylenic double bond utilization expressed as percent;

$I_i$ is the iodine value of the initial monomer which has not been partially polymerized expressed as grams of $I_2$ per 100 grams of sample; and $I_p$ is the iodine value of the partially polymerized monomer expressed as grams of $I_2$ per 100 grams of sample.

The mixture of diethylene glycol (allyl carbonate) compounds each represented by Formula (I) or by Formula (II), may have constituted all of the mixture of ethylenically unsaturated compounds present in the mixture which was partially polymerized, or at least one optional ethylenically unsaturated compound may also have been present. As used herein and in the claims, "optional ethylenically unsaturated compound" means an ethylenically unsaturated compound which is not represented by Formula (I) or by Formula (II). The optional ethylenically unsaturated compound may have been an optional polyethylenically unsaturated compound or it may have been an optional monoethylenically unsaturated compound. When two or more optional ethylenically unsaturated compounds were present, they were optional polyethylenically unsaturated compounds, optional monoethylenically unsaturated compounds, or a mixture of one or more optional polyethylenically unsaturated compounds and one or more optional monoethylenically unsaturated compounds.

Examples of such optional polyethylenically unsaturated compounds which optionally may have been present in the mixture which has been partially polymerized include one or more diol bis(allyl carbonate) compounds each represented by Formula (III):

Formula (III)

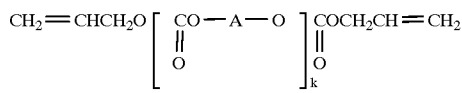

in which A is a divalent radical (other than —$CH_2CH_2OCH_2CH_2$—) derived from a diol represented by Formula (IV):

 Formula (IV)

and k is a positive integer. The divalent radical A may be aliphatic, aromatic, or comprise both aliphatic and aromatic portions. Examples include alkanediyl groups containing from 2 to 10 carbon atoms such as 1,2-ethanediyl, 1,3-propanediyl, 2,2-dimethyl-1,3-propanediyl, 1-methyl-1,2-ethanediyl, 1,4-butanediyl, 1-ethyl-1,2-ethanediyl, 1,5-pentanediyl, 1,6-hexanediyl, 2-ethyl-1,6-hexanediyl, 1,8-octanediyl, and 1,10-decanediyl. Further examples include alkylene ether groups such as —$CH_2OCH_2$—, —$CH_2CH_2CH_2OCH_2CH_2CH_2$— and —$CH_2OCH_2CH_2$—. Other examples include alkylene polyether groups such as —$CH_2CH_2OCH_2CH_2OCH_2CH_2$—, and —$CH_2CH_2CH_2OCH_2CH_2CH_2OCH_2CH_2CH_2$—. Yet other examples include alkylene carbonate groups such as —$CH_2CH_2OC(O)OCH_2CH_2$— and alkylene ether carbonate groups such as —$CH_2CH_2OCH_2CH_2OC(O)OCH_2CH_2$—. Examples of cycloaliphatic groups include 1,3-cyclopentanediyl, 1,3-cyclohexanediyl, 1,4-cyclohexanediyl, and 1,5-cyclooctanediyl. Examples of aromatic groups include 1,3-phenylene and 1,4-phenylene. Examples of groups containing both aliphatic and aromatic portions include 2-methyl-1,4-phenylene, 2,6-dimethyl-1,4-phenylene, methylene-di-4,1-phenylene, 1-methylethylidene-di-4,1-phenylene, 1-methylethylidenebis[2,6-dibromo-4,1-phenylene], 1-methylethylidenebis[2,6-dichloro-4,1-phenylene], 1-methylpropylidene-di-4,61-phenylene, 1-methylethylidenebis(2-methyl-4,1-phenylene], 1,2-ethanediyl-di-4,1-phenylene, methylene-di-2,1-phenylene, 1-methylethylidenebis[2-(1-methylethyl)-4,1-phenylene], 1,3-phenylenebis[1-methylethylidene-4,1-phenylene], 1,4-phenylenebis[1-methylethylidene-4,1-phenylene, sulfonyl-di-4,1-phenylene, cyclohexylidene-di-4,1-phenylene, 1-phenylethylidene-di-4,1-phenylene, ethylidene-di-4,1-phenylene, propylidene-di-4,1-phenylene, 1-ethylpropylidene-di-4,1-phenylene, 1,4-cyclohexanediyl-di-4,1-phenylene, 1,3-cyclohexanediyl-di-4,1-phenylene, 1,2-cyclohexanediyl-di-4,1-phenylene, and thio-di-4,1-phenylene.

Usually k is 1, 2, 3, 4, or 5. Compounds for which k is greater than 5 may have been present in small amounts.

Other optional polyethylenically unsaturated compounds which may have been present in the mixture which was partially polymerized include polyol poly(allyl carbonate) compounds containing three or more (allyl carbonate) groups. Examples include the tris(allyl carbonate) of 1,1,1-trimethylolpropane [CAS 99086-57-4], the tris(allyl carbonate) of 1,1,1-trimethylolethane [CAS 119692-82-9], and the tris(allyl carbonate) of tris(2-hydroxyethyl) isocyanurate [CAS 27063-69-0].

Other optional ethylenically unsaturated compounds which may have been present in the mixture which was partially polymerized include compounds which are devoid of (allyl carbonate) groups but do contain a plurality of allyl groups. Examples include 2,4,6-tris(allyloxy)-1,3,5-triazine [CAS 101-37-1], 1,3,5-triallyl-1,3,5-triazine-2,4,6 (1H,3H, 5H)-trione [CAS 1025-15-6], diallyl phthalate [CAS 131-17-9], triallyl trimellitate [CAS 2694-54-4], and triallyl trimesate [CAS 17832-16-5].

Polymerizable polyethylenically unsaturated compounds which do not contain allyl groups may optionally have been present in the mixture which was partially polymerized. These include the bis(acrylates) and bis(methacrylates) of diols, the tris(acrylates) and tris(methacrylates) of triols, and the tetrakis(acrylates) and tetrakis(methacrylates) of tetraols. Examples of suitable diols include $HOCH_2CH_2OCH_2CH_2OH$ and the diols represented by Formula (IV). Examples of suitable triols include 1,1,1-trimethylolpropane, 1,2,3-propanetriol, and tris(2-hydroxyethyl) isocyanurate. Examples of suitable tetraols include pentaerythritol and erythritol.

In most instances the mixture of diethylene glycol (allyl carbonate) compounds each represented by Formula (I) or by Formula (II) constituted at least 60 percent by weight of the ethylenically unsaturated compounds present in the mixture which was partially polymerized. Often the mixture of diethylene glycol (allyl carbonate) compounds each represented by Formula (I) or by Formula (II) constituted at least 75 percent by weight of the ethylenically unsaturated compounds present in the mixture which was partially polymerized. At least 90 percent by weight is preferred. Substantially 100 percent by weight is within contemplation.

When one or more optional ethylenically unsaturated compounds were also present in the mixture of ethylenically unsaturated compounds which was partially polymerized, they usually constituted from 0.1 to 40 percent by weight of the ethylenically unsaturated compounds present in the mixture. Frequently the optional ethylenically unsaturated compounds constituted from 3 to 10 percent by weight of the ethylenically unsaturated compounds present in the mixture which was partially polymerized.

The mixture of diethylene glycol (allyl carbonate) compounds each represented by Formula (I) or by Formula (II) in which n is a positive integer, m is a positive integer, and the diethylene glycol (allyl carbonate) compound for which the value of n is 1 constitutes from 25 to 75 area percent of the mixture of diethylene glycol (allyl carbonate) compounds, may be prepared by reacting diethylene glycol bischloroformate with a mixture of allyl alcohol and diethylene glycol in the presence of a suitable acid acceptor, as for example, pyridine, a tertiary amine, or an alkaline or alkaline earth metal hydroxide. It is often convenient to use a 50% by weight solution of sodium hydroxide in water as the acid acceptor. A substantially inert, water insoluble organic diluent may optionally be used also. The combined amounts of allyl alcohol and diethylene glycol employed are at least sufficient to react with substantially all of the diethylene glycol bischloroformate. An increase in the ratio of the number of moles of diethylene glycol to the number of moles of diethylene glycol bischloroformate results in a decrease in the area percent of diethylene glycol (allyl carbonate) compound represented by Formula (I) in which n is 1, along with a corresponding increase in the area percent of compounds represented by Formula (I) in which n is greater than 1. The ratio of the number of moles of diethylene glycol to the number of moles of diethylene glycol bischloroformate is generally within the range of from 0.05:1 to 0.9:1. The base is added slowly to the reaction medium containing the diethylene glycol bischloroformate, allyl alcohol, and diethylene glycol, while external cooling is applied in order to control the reaction temperature, often within the range of from 0° C. to 25° C.

After substantially all of the chloroformate groups are reacted, removal of the aqueous phase is often preferred. If desired, the organic phase may be washed with water in order to remove inorganic by-products, and vacuum stripped to remove water, solvent, and other volatile materials.

The mixture of ethylenically unsaturated compounds (including the mixture of diethylene glycol (allyl carbonate) compounds having a low amount of n=1 material) may be partially polymerized by blending the mixture with a high-temperature peroxide initiator and heating the blended mixture to a temperature in the range of from 80° C. to 150° C., preferably while sparging with nitrogen or other non-reactive gas, to form a mixture having an increased 250° C. viscosity in the range of from 25 to 10,000 centipoises (cps) and an ethylenic double bond utilization of at least 3 percent. The reaction mixture is then cooled to ambient temperature. During the cool-down, the viscosity of the reaction mixture increases a small amount, the magnitude of which depends upon the reactivities of the initiator and ethylenically unsaturated compounds, the initial and final temperatures, and the cooling rate. The prepolymer product is substantially storage-stable at ordinary ambient temperatures.

The high-temperature peroxide initiator is one which functions effectively at temperatures of at least 80° C. There are many such initiators, but the preferred initiator is OO-tert-butyl O-(2-ethylhexyl) peroxycarbonate [CAS 34443-12-4]. Another initiator which may be used is tertiary-butylperoxy isopropyl carbonate [CAS 2372-21-6].

The amount of high-temperature initiator which is present in the mixture of ethylenically unsaturated compounds may vary widely. Usually the amount of high-temperature initiator employed is from 10 to 2500 parts of initiator per million parts of monomer, by weight. Frequently the amount employed is from 25 to 1200 parts of initiator per million parts of monomer, by weight. From 25 to 600 parts per million by weight is preferred. From 25 to 200 parts per million by weight is especially preferred. As polymerization progresses, initiator concentration usually decreases. Incremental additions of initiator during polymerization are contemplated.

The mixture of ethylenically unsaturated compounds (including the mixture of diethylene glycol (allyl carbonate) compounds having a low amount of n=1 material) may also be partially polymerized by contacting the mixture with molecular oxygen to increase the hydroperoxide content and then heating the mixture to form the polymerizable, liquid, substantially gel-free, partially polymerized composition. The principles of this method are disclosed in U.S. Pat. No. 4,742,133, the disclosure of which is, in its entirety, incorporated herein by reference. In general, the liquid mixture of ethylenically unsaturated compounds is contacted with molecular oxygen at a temperature of at least about 65° C. to produce a liquid intermediate composition having an increased hydroperoxide content, usually of at least about 300 parts per million by weight ("ppm"). The liquid intermediate composition is thereafter maintained at a temperature of at least about 80° C. to produce the polymerizable, liquid, substantially gel-free composition.

The liquid mixture of ethylenically unsaturated compounds may be contacted with molecular oxygen by agitating the mixture in contact with an atmosphere of substantially pure molecular oxygen or a mixture of molecular oxygen and one or more non-reactive gases until the desired increased level of hydroperoxide content is achieved. Vigorous agitation is preferred. Such agitation may be provided by paddles, stirrers, mixers, pumps, or other similar devices.

Preferably, the liquid mixture of ethylenically unsaturated compounds is contacted with molecular oxygen by bubbling commercially pure molecular oxygen or a mixture of molecular oxygen and one or more non-reactive gases through the mixture until the desired increased level of hydroperoxide content is achieved.

The agitation of the reaction mixture provided by the rising bubbles is often sufficient, but it is preferred to employ additional agitation such as that provided by any of the devices described in the second previous paragraph.

The molecular oxygen employed may be substantially pure or it may be in admixture with one or more non-reactive gases. Examples of non-reactive gases that may be used as diluents include helium, neon, argon, krypton, xenon, nitrogen, carbon dioxide, or a mixture of two or more thereof. Most often the monomer composition is contacted with commercially pure oxygen, air, or a mixture thereof.

In order that the increased hydroperoxide content of the liquid intermediate composition may be attained in a reasonably short time, the molecular oxygen content of the gas brought into contact with the monomer composition usually contains at least about 10 percent molecular oxygen by volume. In many cases the molecular oxygen content of the gas is at least about 20 percent by volume. Preferably the molecular oxygen content is at least about 75 percent by volume.

The temperature at which the mixture of ethylenically unsaturated compounds is contacted with molecular oxygen is at least about 65° C. Usually the temperature is in the range of from about 65° C. to about 130° C. In many cases the temperature is in the range of from about 80° C. to about 120° C. Preferably the temperature is in the range of from about 100° C. to about 110° C.

The hydroperoxide content of mixture of ethylenically unsaturated compounds, intermediate monomer compositions, and prepolymer-containing compositions may be ascertained according to the following procedure: Ten milliliters of sample weighed to the nearest 0.01 gram is is added to a 250-milliliter iodine flask. Twenty milliliters of 1:1 (v/v) chloroform and glacial acetic acid mixture is added to dissolve the sample, followed by small pieces of solid carbon dioxide. As soon as substantially all of the solid carbon dioxide disappears, 4 milliliters of saturated potassium iodide solution is added and the flask is capped and stored in the dark for 30 minutes. Fifty milliliters of distilled water is then added and titration with standard sodium thiosulfate solution (about 0.01 N) is begun with constant stirring. When the color of the liquid has become a pale yellow, one milliliter of 0.2% starch solution is added and the titration is continued until the color changes from blue to colorless. A blank is also titrated in the same manner. The parts by weight of peroxide (calculated as $H_2O_2$) per million parts by weight of sample (ppm) is ascertained from the following formula:

$$P=(T_s-T_b)(N)(17000)/W$$

where:

P is the peroxide assay expressed as ppm $H_2O_2$, $T_s$ is the titer of the sample, expressed as milliliters of the sodium thiosulfate solution, $T_b$ is the titer of the blank, expressed as milliliters of the sodium thiosulfate solution, N is the normality of the sodium thiosulfate solution, and W is the mass of the sample expressed in grams. Although the peroxide content is calculated as $H_2O_2$, for purposes of the present specification and claims, this value is taken as the hydroperoxide content.

The hydroperoxide content of the intermediate composition after being contacted with molecular oxygen may vary widely, but usually the hydroperoxide content is at least about 300 ppm. Ordinarily the hydroperoxide content is in the range of from about 300 to about 5000 ppm. Often the hydroperoxide content is in the range of from about 450 to about 2000 ppm. Preferably the hydroperoxide content is in the range of from about 500 to about 800 ppm.

The temperature at which the intermediate composition is maintained to produce the product is at least about 80° C. Ordinarily the temperature is in the range of from 80° C. to 150° C. In many cases the temperature is in the range of from 100° C. to 120° C. Preferably the temperature is in the range of from 100° C. to 110° C.

The intermediate composition may remain quiescent or it may be agitated while it is maintained at the temperature discussed above. Preferably the intermediate composition is sparged with nitrogen or other nonreactive gas for at least a portion of the time the intermediate composition is maintained at the temperature described above to produce the product which is then cooled or allowed to cool to ambient temperature.

There are many materials which may optionally be present in the polymerizable, liquid, substantially gel-free composition of the invention in admixture with the partially polymerized mixture of ethylenically unsaturated compounds.

Monomer may optionally be present in the polymerizable, liquid, substantially gel-free composition of the invention in admixture with the partially polymerized mixture of ethylenically unsaturated compounds. The optional monomer may be one ethylenically unsaturated compound or it may be a mixture of ethylenically unsaturated compounds. Examples of optional monomer include one or more compounds represented by Formula (I) wherein n is 1, 2, 3, 4, 5, 6, or 7. Other examples include one or more compounds represented by Formula (II) where m is 1, 2, or 3. Yet other examples of such optional monomer include the optional ethylenically unsaturated compounds which may be present in the mixture of ethylenically unsaturated compounds which has been partially polymerized as described above. When present, the optional monomer in admixture with the partially polymerized mixture of ethylenically unsaturated compounds, usually constitutes from 0.1 to 80 percent by weight of the polymerizable, liquid, substantially gel-free composition. The optional monomer in admixture with the partially polymerized mixture of ethylenically unsaturated compounds, often constitutes from 1.5 to 45 percent by weight of the polymerizable, liquid, substantially gel-free composition. From 3 to 10 percent by weight is preferred.

A material which may optionally be present in the polymerizable, liquid, substantially gel-free composition is mold release agent.

Dyes are optional materials that may be present when high transmission of light is not necessary.

Further examples of optional materials that may be present include small amounts of polymerization inhibitors and stabilizers, such as for example triphenyl phosphite and 4-methoxyphenol, to promote stability during storage and ultraviolet light adsorbers.

The listing of optional ingredients discussed above is by no means exhaustive. These and other ingredients may be employed in their customary amounts for their customary purposes so long as they do not seriously interfere with good monomer and polymer formulating practice.

When the polymerizable, liquid, substantially gel-free composition contains one or more optional materials in addition to the partially polymerized mixture of ethylenically unsaturated compounds, it may be made by simply admixing the various ingredients.

In most cases the polymerizable, liquid, substantially gel-free composition of the invention is conformed to the shape of the desired solid polymerized article before polymerization to form such article. For example, the polymerizable, liquid, substantially gel-free composition can be poured onto a flat surface and polymerized to form a flat sheet or coating. According to a still further exemplification, the polymerizable, liquid, substantially gel-free composition is placed in molds, as for instance glass molds, and polymerized to form shaped articles such as lens blanks or lenses. This procedure is particularly advantageous for the preparation of ophthalmic lens blanks and ophthalmic lenses.

The polymerizable, liquid, substantially gel-free composition of the invention may be polymerized to the thermoset state by known conventional techniques for polymerizing (allyl carbonate)-containing formulations.

In one embodiment, polymerization is accomplished by heating the polymerizable formulation containing free radical initiator to elevated temperatures. Usually the heating is accomplished in an oven or in a water bath. Typically polymerization is conducted at temperatures in the range of from about 28° C. to about 130° C. In many cases post curing, that is, heating beyond the time thought necessary to substantially fully polymerize the formulation is employed. The post cure is often carried out at temperatures at or above the maximum temperature of the cure cycle, but below those temperatures at which thermal degradation provides undesirable yellowness, and preferably for a time sufficient to attain either substantially constant or maximum Barcol hardness. In most instances the post cure is accomplished at temperatures in the range of from 100° C. to 130° C.

The initiators which may be used in the present invention to polymerize the polymerizable, liquid, substantially gel-free composition may be widely varied, but in general they are thermally decomposable to produce radical pairs. One or both members of the radical pair are available to initiate addition polymerization of ethylenically unsaturated groups in the well-known manner.

The preferred initiators are peroxy initiators. Many suitable peroxy initiators are disclosed in U.S. Pat. No. 4,959,429, which disclosure is incorporated herein by reference. Diisopropyl peroxydicarbonate [CAS 105-64-6], benzoyl peroxide [CAS 94-36-0], tertiary-butylperoxy isopropyl carbonate [CAS 2372-21-6], and tertiary-amylperoxy isopropyl carbonate [CAS 2372-22-7] are the preferred initiators.

When used, the amount of initiator present in the polymerizable, liquid, substantially gel-free composition of the invention may be widely varied. Ordinarily the weight ratio of the initiator to all ethylenically unsaturated material present in the polymerizable, liquid, substantially gel-free composition is in the range of from about 0.3:100 to about 7:100. In many cases the weight ratio is in the range of from about 0.5:100 to about 5:100. The initiator may be incorporated into polymerizable, liquid, substantially gel-free composition by admixing it with the other components.

It will be recognized by those skilled in the art that the most preferred weight ratios of initiator will depend upon the nature of the initiator used as well as the natures and ratios of the various ethylenically unsaturated materials present in the polymerizable, liquid, substantially gel-free composition of the invention.

A wide variety of cure cycles, that is, time-temperature sequences, may be used during polymerization of the polymerizable, liquid, substantially gel-free composition. Ordinarily the cure cycle employed is based upon a consideration of several factors including the size of the casting, the identity of the initiator, and the reactivity of the ethylenically unsaturated material. A preferred cure cycle for use with diisopropylperoxydicarbonate initiator is shown in Table 1. This cure cycle is only exemplary and others, including those disclosed in Tables 1–4 of U.S. Pat. No. 4,959,429, may be used. Tables 1–4 of U.S. Pat. No. 4,959,429 are incorporated herein by reference.

TABLE 1

| Cumulative Hours | Oven Temperature, ° C. |
| --- | --- |
| 0 | 44 |
| 10.1 | 58 |
| 12.0 | 64 |
| 14.5 | 70 |
| 15.2 | 77 |
| 16.2 | 85 |
| 16.5 | 90 |
| 17.0 | 104 |
| 17.25 | 104 |
| 19.75 | 80 (End of Cycle) |

Note:
The temperature changes between adjacent points shown in the Table are linear.

If molds were employed, the polymerizates are removed from the molds.

In another embodiment, the polymerizable, liquid, substantially gel-free composition is polymerized to the thermoset state by exposure to ionizing radiation such as gamma radiation, X-rays, accelerated electrons, accelerated protons, accelerated alpha-particles, or high speed neutrons.

As used herein, the density of a polymerizable, liquid, substantially gel-free composition is determined in accordance with ASTM Method D 4052-96.

Often the present polymerizable, liquid, substantially gel-free compositions have 25° C. viscosities of 10,000 centipoises (cps) or lower. In many instances the 25° C. viscosity is 3000 cps or lower. Frequently the 25° C. viscosity is 1000 cps or lower. Preferably, the 25° C. viscosity is 400 cps or lower. More preferably the 25° C. viscosity is 150 cps or lower. As used herein, the viscosity of a polymerizable, liquid, substantially gel-free composition is determined in accordance with ASTM Test Method D 2393-86.

As used herein the refractive index of a polymerizable, liquid, substantially gel-free composition is determined in accordance with ASTM Method D 1218-92.

As used herein the yellowness index of a polymerizable, liquid, substantially gel-free composition is determined in accordance with ASTM Method E 450-82 (reapproved 1987).

Often the density of solid polymerizates produced from the polymerizable, liquid, substantially gel-free composition of the invention is 1.6 grams per cubic centimeter (g/cm$^3$) or lower. Frequently the density is 1.45 g/cm$^3$ or lower. Preferably the density is 1.35 g/cm$^3$ or lower. As used herein, the density of a solid polymerizate is determined in accordance with ASTM Test Method D 792-91.

The luminous transmissions of solid polymerizates produced from the polymerizable, liquid, substantially gel-free compositions of the invention may vary widely depending upon the intended use. In most instances, however, the luminous transmission is at least 90 percent. As used herein luminous transmission of a solid polymerizate is determined on samples having a thickness of 3.2 millimeters in accordance with ASTM Test Method D 1003-95 using a HunterLab® Colorquest® II Sphere Colorimeter System (Hunter Associates Laboratory, Inc., Reston, Va., USA). As the luminous transmission approaches one hundred percent, the difference in luminous transmissions for two samples of the same material but of differing thicknesses approaches zero. Consequently, values of luminous transmission of 90 percent or greater ascertained from samples having thicknesses as low as about 2 millimeters or as high as about 4 millimeters approximate reasonably well the luminous transmission at the standard thickness.

The yellowness indices of solid polymerizates produced from the polymerizable, liquid, substantially gel-free composition may vary widely depending upon the intended use. Often, however, the yellowness index is 4 or lower. Frequently the yellowness index is 2 or lower. Preferably the yellowness index is 1 or lower. As used herein, the yellowness index of a solid polymerizate is determined on specimens having a thickness of 3.2 millimeters in accordance with ASTM Test Method D 1925-70 (Reapproved 1988) using a HunterLab® Colorquest® II Sphere Colorimeter System (Hunter Associates Laboratory, Inc., Reston, Va., USA). Although the yellowness index seems to vary more with sample thickness than luminous transmission, nevertheless yellowness indices ascertained from samples having thicknesses as low as about 2 millimeters or as high as about 4 millimeters do provide a useful general indication of the yellowness index at the standard thickness.

The heat distortion temperature of a solid polymerizate produced from the polymerizable, liquid, substantially gel-free composition of the invention may vary widely, but usually the heat distortion temperature is at least 35° C. Preferably the heat distortion temperature is at least 50° C. As used herein, the heat distortion temperature of a solid polymerizate produced from the polymerizable, liquid, substantially gel-free composition of the invention is determined for a deflection of 0.25 millimeters (10 mils) in accordance with ASTM D 648-95.

As used herein, Barcol hardness of a solid polymerizate produced from the polymerizable, liquid, substantially gel-free composition of the invention is determined in accordance with ASTM Test Method D 2583-95 using a Barcol Impressor and taking scale readings 15 seconds after the impressor point has penetrated the specimen.

As used herein, the refractive index of a solid polymerizate produced from the polymerizable, liquid, substantially gel-free composition of the invention is determined in accordance with ASTM Test Method D 542-95.

As used herein, the Abbe Number of a solid polymerizate produced from the polymerizable, liquid, substantially gel-free composition of the invention is determined in accordance with its usual definition:

$$A=(n_D-1)/(n_F-n_C)$$

where:
$n_D$ is the refractive index using a wavelength of 589.3 nanometers (viz., the average of the yellow doublet of sodium), $n_F$ is the refractive index using a wavelength of 486.1 nanometers (viz., the blue line of hydrogen), and $n_C$ is the refractive index using a wavelength of 656.3 nanometers (viz., the red line of hydrogen).

The invention is further described in conjunction with the following example which is to be considered illustrative rather than limiting, and in which all parts are parts by weight and all percentages are percentages by weight unless otherwise specified.

EXAMPLE

Diethylene glycol bischloroformate (DECF) [CAS 106-75-2], allyl alcohol (AA) [CAS 107-18-6], and diethylene glycol (DEG) [CAS 111-46-6] were mixed together in the following molar ratio: 1.00 DECF/1.96 AA/0.21 DEG. To this mixture, 2.44 moles of NaOH (in the form of a 50% by weight solution in water) was slowly added, while maintaining a reaction temperature of 50° C. with external cooling. After substantially all of the chloroformate groups had reacted, the aqueous phase was removed and the resulting mixture of diethylene glycol (allyl carbonate) compounds was washed twice with water. It was then vacuum stripped at an absolute pressure of approximately 1.3 Pascals at a temperature of approximately 150° C. The results of high performance liquid chromatographic analysis of the mixture based on Formula (I) and Formula (II) are shown in Table 2:

TABLE 2

| Compound | | Amount, area % |
|---|---|---|
| n | m | |
| 1 | | 64.1 |
| 2 | | 5.0 |
| 3 | | 17.6 |
| 4 | | 3.0 |
| 5 | | 5.2 |
| 6 | | 1.0 |
| 7 | | 1.1 |
| | 1 | 0.5 |
| | 2 | 1.1 |
| | 3 | 0.7 |
| Total[1] | | 99.3 |

[1]Several other peaks of small areas for compounds of uncertain structures were also present.

A 114-liter, glass-lined, jacketed reactor equipped with an agitator, thermocouples, and sources of steam and city water connected to the jacket for heating and cooling, respectively, was charged with 81.65 kilograms (kg) of the above mixture of diethylene glycol (allyl carbonate) compounds characterized by Table 2, 4.90 kg of 2,4,6-tris(allyloxy)-1,3,5-triazine containing approximately 180 ppm 4-methoxyphenol, and 17.3 grams of OO-tert-butyl O-(2-ethylhexyl) peroxycarbonate. The charged materials were admixed to form a reaction mixture. The viscosity of the reaction mixture was between 30 and 31 cps at 25° C. and the density was 1.1628 g/cm$^3$ at 25° C. The reaction mixture was stirred and heated to 110° C. and maintained at 110° C. while sparging with nitrogen at a flow rate of 0.05 reactor volume/minute. Samples were withdrawn every 30 minutes in order to monitor the reaction mixture viscosity. After 3.5 hours at 110° C., the 25° C. viscosity of the reaction mixture reached about 90 cps. The frequency of sample removal was thereafter increased to once every 10 to 15 minutes. After 4 hours at 110° C., the 25° C. viscosity of the reaction mixture was 105 cps. The reaction mixture was then cooled to about 80° C. within 30 minutes by gradually increasing the amount of cold water in the steam-water mixture that was being supplied to the jacket inlet. The reaction mixture was then cooled to 50° C. over a 1 hour period. During the cool-down from 110° C., there was an additional viscosity increase of 12 cps, resulting in a viscosity of 117 cps measured at 25° C. for the product. The density of the product was 1.1780 g/cm$^3$ at 25° C.

According to measurements carried out by iodometric titration, 9 percent of the double bonds were consumed during the reaction. The product was a polymerizable, liquid, substantially gel-free composition.

Portions of the above polymerizable, liquid, substantially gel-free composition were stored for various periods of time after which several properties were determined. The results are shown in Table 3:

TABLE 3

| Storage Conditions | | | | | |
|---|---|---|---|---|---|
| Storage Period, months | 0 | 7 | 3 | 4 | 6 |
| Storage Temperature, ° C. | NA[1] | 22–26 | 40–43 | 40–43 | 40–43 |
| Properties | | | | | |
| Density at 25° C., g/cm$^3$ | 1.1780 | 1.1780 | 1.1781 | 1.1789 | 1.1798 |
| Viscosity, at 25° C., cps | 117 | 117 | 123 | 138 | 162 |
| Refractive Index, $n_D^{20}$ | 1.4627 | 1.4627 | ND[2] | ND | 1.4627 |
| Yellowness Index, (50 mm path length) | 1.7 | 1.7 | 1.9 | 1.7 | 2.1 |

[1]NA = Not Applicable
[2]ND = Not Determined

A portion of the above unaged polymerizable, liquid, substantially gel-free composition was initiated with 3.5 parts of diisopropylperoxydicarbonate per 100 parts of polymerizable, liquid, substantially gel-free composition, by weight (phr). The initiated composition was poured into a mold and polymerized into a sheet 3.175 millimeters thick using the cure cycle of Table 1. The thermoset polymer which resulted was allowed to cool to ambient temperature and then tested for various physical properties. A portion of the polymerizable, liquid, substantially gel-free composition which had been aged for 6 months at 40° C.–43° C. was initiated with 3.5 phr of diisopropylperoxydicarbonate. The initiated composition was poured into a mold and polymerized into a sheet 3.175 millimeters thick using the cure cycle of Table 1. The thermoset polymer which resulted was allowed to cool to ambient temperature and then tested for various physical properties. The results of testing are shown in Table 4:

TABLE 4

| | From Initial Prepolymer | From Aged Prepolymer |
|---|---|---|
| Shrinkage, % | 10.9 | ND[1] |
| Density at 25° C., g/cm$^3$ | 1.322 | 1.321 |
| Luminous Transmission, % | 93.9 | 93.7 |
| Yellowness Index | 0.8 | 0.9 |
| Heat Distortion Temperature, C. | 55 | 57 |
| Barcol Hardness | 23 | 28 |
| Refractive Index, $n_D^{20}$ | 1.5011 | 1.5013 |
| Abbe Number | 54 | 59 |

[1]ND = Not Determined

Although the present invention has been described with reference to specific details of certain embodiments thereof, it is not intended that such details should be regarded as limitations upon the scope of the invention except insofar as they are included in the accompanying claims.

We claim:

1. A polymnerizable, liquid, substantially gel-free composition comprising a partially polymerized mixture of ethylenically unsaturated compounds wherein:

(a) the mixture of ethylenically unsaturated compounds which was partially polymerized comprised a mixture of diethylene glycol (allyl carbonate) compounds each represented by Formula (I):

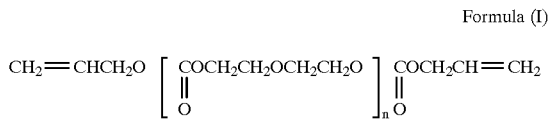

Formula (I)

or by Formula (II):

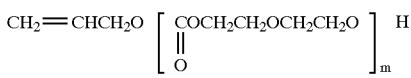

in which n is a positive integer, m is a positive integer, and the diethylene glycol (allyl carbonate) compound for which the value of n is 1 constituted from 25 to 75 area percent of the mixture of diethylene glycol (allyl carbonate) compounds; and (b) the ethylenic double bond utilization of the polymerizable, liquid, substantially gel-free composition is at least 3 percent.

2. The polymerizable, liquid, substantially gel-free composition of claim 1 wherein the diethylene glycol (allyl carbonate) compound represented by Formula (I) for which the value of n is 1 constituted from 45 to 75 area percent of the mixture of diethylene glycol (allyl carbonate) compounds.

3. The polymerizable, liquid, substantially gel-free composition of claim 1 wherein the diethylene glycol (allyl carbonate) compound represented by Formula (I) for which the value of n is 1 constituted from 60 to 70 area percent of the mixture of diethylene glycol (allyl carbonate) compounds.

4. The polymerizable, liquid, substantially gel-free composition of claim 1 wherein the ethylenic double bond utilization of the polymerizable, liquid, substantially gel-free composition is in the range of from 3 to 16 percent.

5. The polymerizable, liquid, substantially gel-free composition of claim 1 wherein the ethylenic double bond utilization of the polymerizable, liquid, substantially gel-free composition is in the range of from 8 to 12 percent.

6. The polymerizable, liquid, substantially gel-free composition of claim 1 wherein:

(a) compounds represented by Formula (I) for which n is 1, 2, 3, 4, 5, 6, and 7 collectively constituted at least 85 area percent of the mixture of diethylene glycol (allyl carbonate) compounds, (b) compounds represented by Formula (I) for which n is greater than 7 collectively constituted from 0 to 5 area percent of the mixture of diethylene glycol (allyl carbonate) compounds, (c) compounds represented by Formula (II) for which m is 1, 2, and 3 collectively constituted from 0.01 to 7 area percent of the mixture of diethylene glycol (allyl carbonate) compounds, and (d) compounds represented by Formula (II) for which m is greater than 3 collectively constituted from 0 to 3 area percent of the mixture of diethylene glycol (allyl carbonate) compounds.

7. The polymerizable, liquid, substantially gel-free composition of claim 1 wherein the mixture of ethylenically unsaturated compounds which was partially polymerized also comprised at least one optional ethylenically unsaturated compound.

8. The polymerizable, liquid, substantially gel-free composition of claim 7 wherein the optional ethylenically unsaturated compound was diol bis(allyl carbonate) compound represented by the formula:

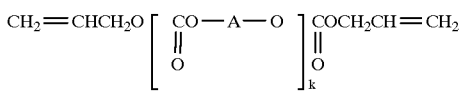

in which A is a divalent radical other than $-CH_2CH_2OCH_2CH_2-$ derived from a diol represented by the formula:

$$HO-A-OH$$ 

and k is a positive integer.

9. The polymerizable, liquid, substantially gel-free composition of claim 7 wherein the optional ethylenically unsaturated compound was a polyol poly(allyl carbonate) compound containing three or more (allyl carbonate) groups.

10. The polymerizable, liquid, substantially gel-free composition of claim 7 wherein the optional ethylenically unsaturated compound was the tris(allyl carbonate) of 1,1,1-trimethylolpropane, the tris(allyl carbonate) of 1,1,1-trimethylolethane, or the tris(allyl carbonate) of tris(2-hydroxyethyl)isocyanurate.

11. The polymerizable, liquid, substantially gel-free composition of claim 7 wherein the optional ethylenically unsaturated compound was a compound which was devoid of (allyl carbonate) groups but did contain a plurality of allyl groups.

12. The polymerizable, liquid, substantially gel-free composition of claim 7 wherein the optional ethylenically unsaturated compound was 2,4,6-tris(allyloxy)-1,3,5-triazine, 1,3,5-triallyl-1,3,5-triazine-2,4,6(1H,3H,5H)-trione, diallyl phthalate, triallyl trimellitate, or triallyl trimesate.

13. The polymerizable, liquid, substantially gel-free composition of claim 7 wherein the optional ethylenically unsaturated compound was a bis(acrylate) of a diol, a bis(methacrylate) of a diol, a tris(acrylate) of a triol, a tris(methacrylate) of a triol, a tetrakis(acrylate) of a tetraol or a tetrakis(methacrylate) of a tetraol.

14. The polymerizable, liquid, substantially gel-free composition of claim 7 wherein the optional ethylenically unsaturated compounds constituted from 0.1 to 40 weight percent of the mixture of ethylenically unsaturated compounds which was partially polymerized.

15. The polymerizable, liquid, substantially gel-free composition of claim 1 wherein the mixture of diethylene glycol (allyl carbonate) compounds each represented by Formula (I) or by Formula (II) constituted at least 60 weight percent of the mixture of ethylenically unsaturated compounds which was partially polymerized.

16. The polymerizable, liquid, substantially gel-free composition of claim 1 wherein the mixture of diethylene glycol (allyl carbonate) compounds each represented by Formula (I) or by Formula (II) constituted at least 90 weight percent of the mixture of ethylenically unsaturated compounds which was partially polymerized.

17. The polymerizable, liquid, substantially gel-free composition of claim 1 which further comprises optional monomer in admixture with the partially polymerized mixture of ethylenically unsaturated compounds.

18. The polymerizable, liquid, substantially gel-free composition of claim 17 wherein the optional monomer comprises at least one compound represented by the formula:

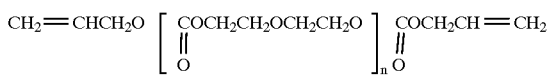

or by formula:

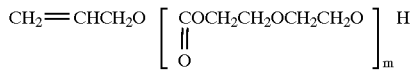

wherein n is 1, 2, 3, 4, 5, 6, or 7 and m is 1, 2, or 3.

19. The polymerizable, liquid, substantially gel-free composition of claim 17 wherein the optional monomer comprises at least one compound represented by the formula:

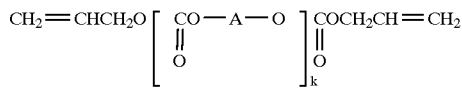

in which A is a divalent radical other than —$CH_2CH_2OCH_2CH_2$— derived from a diol represented by the formula:

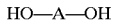

and k is a positive integer.

20. The polymerizable, liquid, substantially gel-free composition of claim 17 wherein the optional monomer comprises at least one member selected from the group consisting of the tris(allyl carbonate) of 1,1,1-trimethylolpropane, the tris(allyl carbonate) of 1,1,1-trimethylolethane, the tris (allyl carbonate) of tris(2-hydroxyethyl)isocyanurate, 2,4,6-tris(allyloxy)-1,3,5-triazine, 1,3,5-triallyl-1,3,5-triazine-2,4,6 (1H,3H,5H)-trione, diallyl phthalate, triallyl trimellitate, and triallyl trimesate.

21. The polymerizable, liquid, substantially gel-free composition of claim 17 wherein the optional monomer comprises at least one member selected from the group consisting of bis(acrylate) of a diol, bis(methacrylate) of a diol, tris(acrylate) of a triol, tris(methacryate) of a triol, tetrakis (acrylate) of a tetraol, and tetrakis(methacrylate) of a tetraol.

22. The polymerizable, liquid, substantially gel-free composition of claim 17 wherein the optional monomer in admixture with the partially polymerized mixture of ethylenically unsaturated compounds, constitutes from 0.1 to 80 percent by weight of the polymerizable, liquid, substantially gel-free composition.

* * * * *